(12) United States Patent
Shimamura et al.

(10) Patent No.: US 6,557,578 B2
(45) Date of Patent: May 6, 2003

(54) FUEL VAPOR TREATING APPARATUS

(75) Inventors: Hiroshi Shimamura, Sashima-gun (JP);
Norikazu Sugimura, Sashima-gun (JP);
Hidemi Masuda, Sashima-gun (JP);
Koji Sugiura, Sashima-gun (JP)

(73) Assignee: Kyosan Denki Co., Ltd., Sashima-gun (JP)

( * ) Notice: Subject to any disclaimer, the term of this patent is extended or adjusted under 35 U.S.C. 154(b) by 0 days.

(21) Appl. No.: 09/883,180

(22) Filed: Jun. 19, 2001

(65) Prior Publication Data
US 2001/0054438 A1 Dec. 27, 2001

(30) Foreign Application Priority Data
Jun. 26, 2000 (JP) ......................................... 2000-191598

(51) Int. Cl.⁷ .............................................. F16K 24/04
(52) U.S. Cl. ......................................... 137/202; 137/43
(58) Field of Search ..................... 137/43, 202

(56) References Cited

U.S. PATENT DOCUMENTS

| | | | | |
|---|---|---|---|---|
| 5,535,772 A | * | 7/1996 | Roetker et al. | 137/202 |
| 5,577,526 A | * | 11/1996 | Kasugai et al. | 137/202 |
| 5,944,044 A | * | 8/1999 | King et al. | 137/202 |
| 6,035,884 A | * | 3/2000 | King et al. | 137/202 |
| 6,058,970 A | | 5/2000 | Osaki et al. | |
| 6,425,379 B2 | * | 7/2002 | Shimamura et al. | 137/202 |
| 6,439,206 B1 | * | 8/2002 | Shimamura et al. | 137/202 |

OTHER PUBLICATIONS

Chrysler Corporation Service Manuel "1999 Cirrus, Stratus and Breeze", 1998.
U.S. patent application No. 09/740,845, filed Dec. 21, 2000.

* cited by examiner

*Primary Examiner*—Gerald A. Michalsky
(74) *Attorney, Agent, or Firm*—Oliff & Berridge, PLC

(57) ABSTRACT

A fuel vapor treating apparatus includes a lower valve casing and an upper valve casing. A float is provided in the lower valve casing and a valve portion is provided in the float for sealing the flow of fuel. A valve port is provided between the lower valve casing and the upper valve casing and is opened and closed by the valve portion. A vent passage portion is provided in the upper valve casing. A space portion is provided between the vent passage portion and the valve port. A valve portion of the float moves vertically in accordance with a liquid level in a fuel tank and opens and closes the valve port, whereby the fuel tank is brought into communication with the vent passage portion. A vent port is provided in a partition that separates the space portion from the vent passage portion. And, a second float is provided to open and close the vent port. The fuel vapor treating apparatus reliably stops fuel leakage from the fuel tank.

18 Claims, 10 Drawing Sheets

FUEL VAPOR TREATING APPARATUS

INCORPORATION BY REFERENCE

The disclosure of Japanese Patent Application No. 2000-191598 filed on Jun. 26, 2000 including the specification, drawings and abstract is incorporated herein by reference in its entirety.

BACKGROUND OF THE INVENTION

1. Field of Invention

The invention relates to a fuel vapor treating apparatus that prevents fuel vapors in a vehicular fuel tank from being discharged to the atmosphere and, more particularly, to a fuel vapor treating apparatus that prevents fuel from being transferred to a canister via a vent line when a fuel tank is filled with fuel and that stops fuel from flowing out when a vehicle inclines or rolls over.

2. Description of Related Art

A vehicular fuel tank is provided with a liquid level sensing valve that closes a vent line when the fuel tank is filled with fuel, a fuel-cut valve that closes an evaporate line to prevent fuel from flowing out of the evaporate line when the vehicle inclines or rolls over, and so on.

Each of these valves is composed of a float that moves vertically in accordance with a liquid level of fuel.

Hereinafter, a known fuel vapor controlling apparatus according to one example of the related art will be described with reference to FIG. 3.

A fuel tank 1 is fitted with a valve casing 4 in which a liquid level sensing valve 2 is integrated with a fuel-cut valve 3.

The valve casing 4 is composed of a lower valve casing 4A and an upper valve casing 4B that is provided above the lower valve casing 4A. A liquid level sensing float 5 and a fuel-cut float 6 are provided in the lower valve casing 4A.

A valve portion 7 is provided on an upper face of the liquid level sensing float 5. A valve portion 8 is provided also in an upper portion of the fuel-cut float 6. Valve ports 9, 10 are provided between the lower valve casing 4A and the upper valve casing 4B. The valve port 9 is opened and closed by the valve portion 7, whereas the valve port 10 is opened and closed by the valve portion 8. The upper valve casing 4B is provided with a vent passage portion 11 that is connected to the valve port 9 via a space portion 12. The space portion 12 is connected to the valve port 10 via a passage 13.

Hereinafter, operation of the known fuel vapor controlling apparatus according to the related art shown in FIG. 3 will be described.

If the pressure of fuel vapors in the fuel tank 1 becomes high during supply of fuel, the fuel vapors pass through the valve port 9 provided in the valve casing 4 and are discharged into a canister (not shown), an intake pipe (not shown) and so on as indicated by an arrow P shown in FIG. 3.

If the liquid level of fuel in the fuel tank 1 becomes high, the liquid level sensing float 5 rises and the valve body 7 closes the valve port 9. Thus, fuel is prevented from being fed directly to the canister and so on.

If the pressure of fuel vapors in the fuel tank 1 remains high during normal operation, the liquid level sensing float 5 is stuck to the valve port 9 and the vent passage portion 11 remains closed. Therefore, the pressure in the fuel tank 1 needs to be reduced.

Thus, the liquid level sensing float 5 is designed to fall because of its own weight.

In the case where the vehicle has greatly inclined or rolled over, there is an apprehension that a large amount of fuel in the fuel tank 1 may flow out toward the canister via the valve port 10 and the passage 13. However, if the vehicle has greatly inclined or rolled over, the fuel-cut float 6 rises and the valve body 8 closes the valve port 10 to prevent fuel from flowing out.

As shown in FIG. 3, while the liquid level sensing float 5 and the fuel-cut float 6 are provided in the same valve casing 4, they are provided in separate valve casings.

A fuel vapor treating apparatus according to a second example of the related art of the invention will be described with reference to FIG. 4.

A fuel tank 21 is fitted with a liquid level sensing valve 22 and a fuel-cut valve 23 separately. A vent passage portion 25 is provided in a valve casing 24 for the liquid level sensing valve 22, and a passage 27 is provided in a valve casing 26 for the fuel-cut valve 23. A space portion 28 is provided in the valve casing 24 for the liquid level sensing valve 22, and a connecting port 29 is provided in the space portion 28. The connecting port 29 is connected to the passage 27 by a hose 30.

Also in the related art shown in FIG. 4, the same operation as in the construction shown in FIG. 3 is performed. Namely, if the liquid level of fuel in the fuel tank 21 becomes high, the liquid level sensing valve 22 closes the vent passage portion 25. Thus, fuel is prevented from being fed directly to the canister and so on.

If the pressure of fuel vapors in the fuel tank 21 remains high during normal operation, the float of the liquid level sensing valve 22 is stuck to the valve port and the vent passage portion 25 remains closed. Therefore, the pressure in the fuel tank 21 needs to be reduced. Thus, using the valve port of the fuel-cut valve 23, the float is designed to fall because of its own weight.

In the case where the vehicle has greatly inclined or rolled over, there is a possibility that a large amount of fuel in the fuel tank 21 may flow out toward the canister via the valve port of the fuel-cut valve 23 and the passage 27. However, if the vehicle has greatly inclined or rolled over, the float of the fuel-cut valve 23 rises to close the valve port and thus prevent fuel from flowing out.

However, the fuel vapor treating apparatuses of the above described related art contain the following problems.

First, since the space portions 12, 28 are directly connected to the vent passage portions 11, 25 respectively, fuel that has leaked from the valve port 9 due to vibration of the vehicle or the like may be transferred toward the canister and adversely affect the canister.

Further, since the valve port 9 is directly exposed to fuel in the fuel tank, fuel may leak from the valve port 9.

Further, in the construction in which the connecting port 29 of the liquid level sensing valve 22 is connected to the passage 27 of the fuel-cut valve 23 by the hose 30 (See, e.g., FIG. 4), assembly of parts cannot be performed by single simple step. Therefore, this operation is time-consuming and laborious and requires preparing a large number of different types of parts. This leads to an increase in number of parts.

Japanese Patent Application No. 11-369719 discloses a fuel vapor treating apparatus that improves the disadvantages of the fuel vapor treating apparatuses of the above related art, including, e.g., reducing an amount of fuel leakage, simplifying the mounting of pipe lines, and reducing the number of parts.

Hereinafter, the fuel vapor treating apparatus disclosed in Japanese Patent Application No. 11-369719 includes the following three features.

First, a partition for stopping the flow of fuel is provided between a space portion of a liquid level sensing valve and a vent passage portion so as to reduce the amount of fuel leakage. Next, a tubular cover covers the liquid level sensing valve so as to prevent a valve port of the liquid level sensing valve from being exposed directly to fuel. Further, a connecting port of the liquid level sensing valve is connected to a passage of a fuel-cut valve by a connector that allows assembly by single simple step, or by a nipple used to make fingertip connection possible, in an attempt to reduce the number of parts and for ease of assembly.

FIGS. 5 and 6 illustrate a third example of the related art. A partition for stopping flow of fuel is provided between a space portion of a liquid level sensing valve and a vent passage portion.

A valve casing of a liquid level sensing valve 41 is composed of a lower valve casing 42 and an upper valve casing 43 that is provided above the lower valve casing 42.

A float 44 is provided in the lower valve casing 42, and a valve portion 45 is provided on an upper face of the float. A valve port 46 is provided between the lower valve casing 42 and the upper valve casing 43 and is opened and closed by the valve portion 45. A vent passage portion 47 is provided in the upper valve casing 43, and a space portion 48 is provided between the vent passage portion 47 and the valve port 46.

In the above construction, the float 44 moves vertically in accordance with a liquid level in a fuel tank (not shown). The valve portion 45 of the float 44 opens and closes the valve port 46, whereby the fuel tank is brought into communication with the vent passage portion 47.

In FIG. 5, a shield member 49, for reducing a cross-sectional area of the space portion 48 is provided in the space portion 48.

Specifically, the shield member 49 has a plurality of shield members 49A and shield members 49B that are alternately disposed. The shield member 49A extends downward from above and the shield member 49B extends upward from below.

Although a fuel-cut valve is not shown in these drawings, the fuel-cut valve may either be integrated with the liquid level sensing valve as shown in FIGS. 3 and 4 or may be separated from the liquid level sensing valve.

According to the above related art, since the shield member 49 stops the flow of fuel, the amount of fuel leakage from the valve port 46 can be reduced.

In addition to the example shown in FIGS. 5 and 6, a fourth exemplary construction that reduces the amount of fuel leakage, by stopping flow of fuel, is shown in FIGS. 7 and 8.

In this example, the space portion between the valve port 46 and the vent passage portion 47 is constructed as a helical passage 48A.

Because other structural components are identical with those of the above example, they are simply denoted by the same reference numerals and will not be described below.

Because the helical passage 48A also stops flow of fuel, the amount of fuel leaking from the valve port 46 can be reduced.

In addition to the above example, a fifth exemplary construction that stops flow of fuel is shown in FIG. 9.

In this example, the space portion between the valve port 46 and the vent passage portion 47 is constructed as a plurality of vertically arranged stepped space portions 48B, 48C and 48D. Vent ports 50 are provided in partitions 49 that separate the space portions from one another. Because the stepped space portions 48B, 48C and 48D also stop flow of fuel, the amount of fuel leaking from the valve port 46 can be reduced.

FIG. 10 illustrates a sixth exemplary construction of the related art that stops flow of fuel. An inflow opening 51 for fuel or fuel vapors is provided in the lower valve casing 42. A tubular cover 52 that covers the inflow opening 51 is either integral with the upper valve casing 43 or provided separately therefrom. By providing a member that covers the inflow opening, fuel can be prevented from reaching the valve port 46 of the liquid level sensing valve 41. Thus, fuel is prevented from being transferred to the canister via the vent passage portion 47.

The various constructions of the above described related art are intended to stop the flow of fuel and to reliably prevent fuel leakage. However, in some cases, fuel may pass through the member designed to stop the flow of fuel and cause leakage.

SUMMARY OF THE INVENTION

It is thus an object of the invention to provide a fuel vapor treating apparatus that further reduces an amount of fuel leaking from a fuel tank, that simplifies mounting of pipe lines, and that has a reduced number of parts.

A fuel vapor treating apparatus according to a first aspect of the invention includes a fuel tank that stores fuel, a passage through which vapors of the fuel flow, a space portion interposed between the fuel tank and the passage, a first normally-open valve that closes a first communication passage for communication between the fuel tank and the space portion in accordance with a liquid level of fuel in the fuel tank, and a second normally-open valve that closes a second communication passage for communication between the passage and the space portion in accordance with a liquid level of fuel flowing into the space portion.

DETAILED DESCRIPTION OF PREFERRED EMBODIMENTS

Hereinafter, a first embodiment of the invention will be described with reference to FIG. 1.

A partition having a vent port is provided between a vent passage portion and a space portion of a liquid level sensing valve and the flow of fuel is stopped by providing a second float for opening and closing the vent port.

Figure 1:
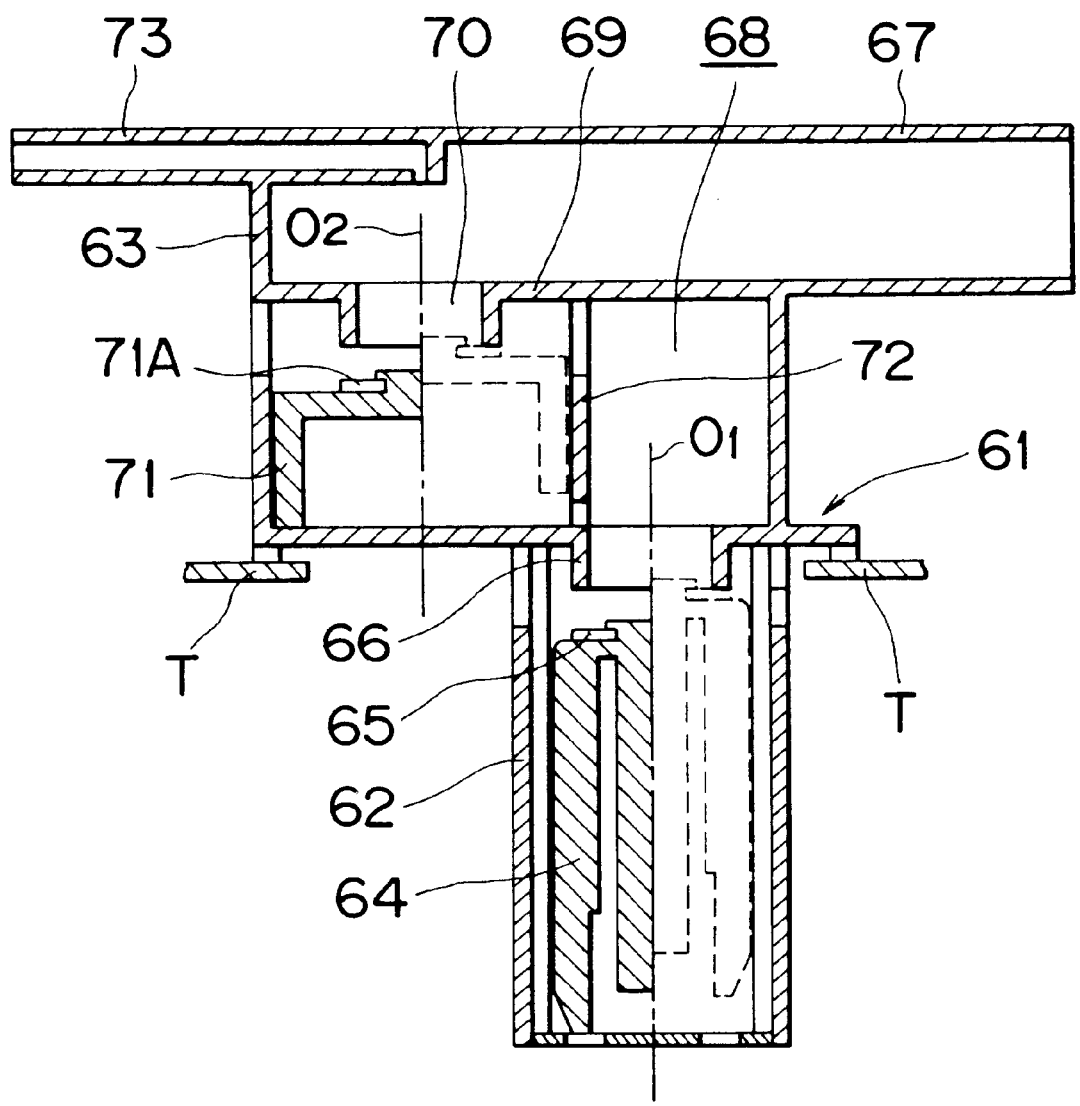
FIG. 1 is a cross-sectional view of a fuel vapor treating apparatus according to a first embodiment of the invention.

Referring specifically to FIG. 1, a valve casing of a liquid level sensing valve 61 is composed of a lower valve casing 62 and an upper valve casing 63 that is disposed above the lower valve casing 62.

A float 64 is provided in the lower valve casing 62, and a valve portion 65 is provided on an upper face of the float 64. A valve hole 66 is provided between the lower valve casing 62 and the upper valve casing 63 and is opened and closed by the valve portion 65. A vent passage portion 67 is provided in the upper valve casing 63, and a space portion 68 is provided between the vent passage portion 67 and the valve hole 66.

In the above construction, the float 64 moves vertically in accordance with a liquid level of a fuel tank T. The valve portion 65 of the float 64 opens the valve port 66, whereby the fuel tank is brought into communication with the vent passage portion 67.

In the above embodiment of the invention, a partition 69 for separating the space portion 68 from the vent passage portion 67 is provided in the space portion 68, and a vent port 70 is provided in the partition 69. A second float 71 for opening and closing the vent port 70 is provided.

A valve body 71A is provided in an upper portion of the second float 71. It is preferred that the valve body 71A be made from rubber or a soft plastic material such as fluororesin or the like to reliably close, or seal, the vent port 70. Vertical movements of the second float 71 are guided by a guide tube 72 that extends from the partition 69.

In this embodiment, an axial center $O_1$ of the float 64 is eccentric with respect to an axial center $O_2$ of the second float 71. That is, the float 64 and the second float 71 are disposed with their central positions offset from each other, so that an increase in flow resistance and a decrease in the amount of leakage can be achieved. As a result, leakage of fuel from the valve port 66 can be further restrained.

Although a fuel-cut valve is not shown in FIG. 1, a fuel-cut valve (not shown) is connected to a fuel-cut valve connecting port 73. The fuel-cut valve may either have a known structure or be integrated with the liquid level sensing valve.

According to the above construction of the invention, since the second float 71 stops the flow of fuel, leakage of fuel from the vent port 70 can be reliably prevented.

Furthermore, the axial center of the second float 71 of the invention may not necessarily be eccentric with respect to the axial center of the float 64. For example, the axial centers of these floats may coincide with each other as shown in FIG. 2 in a second embodiment.

Figure 2:
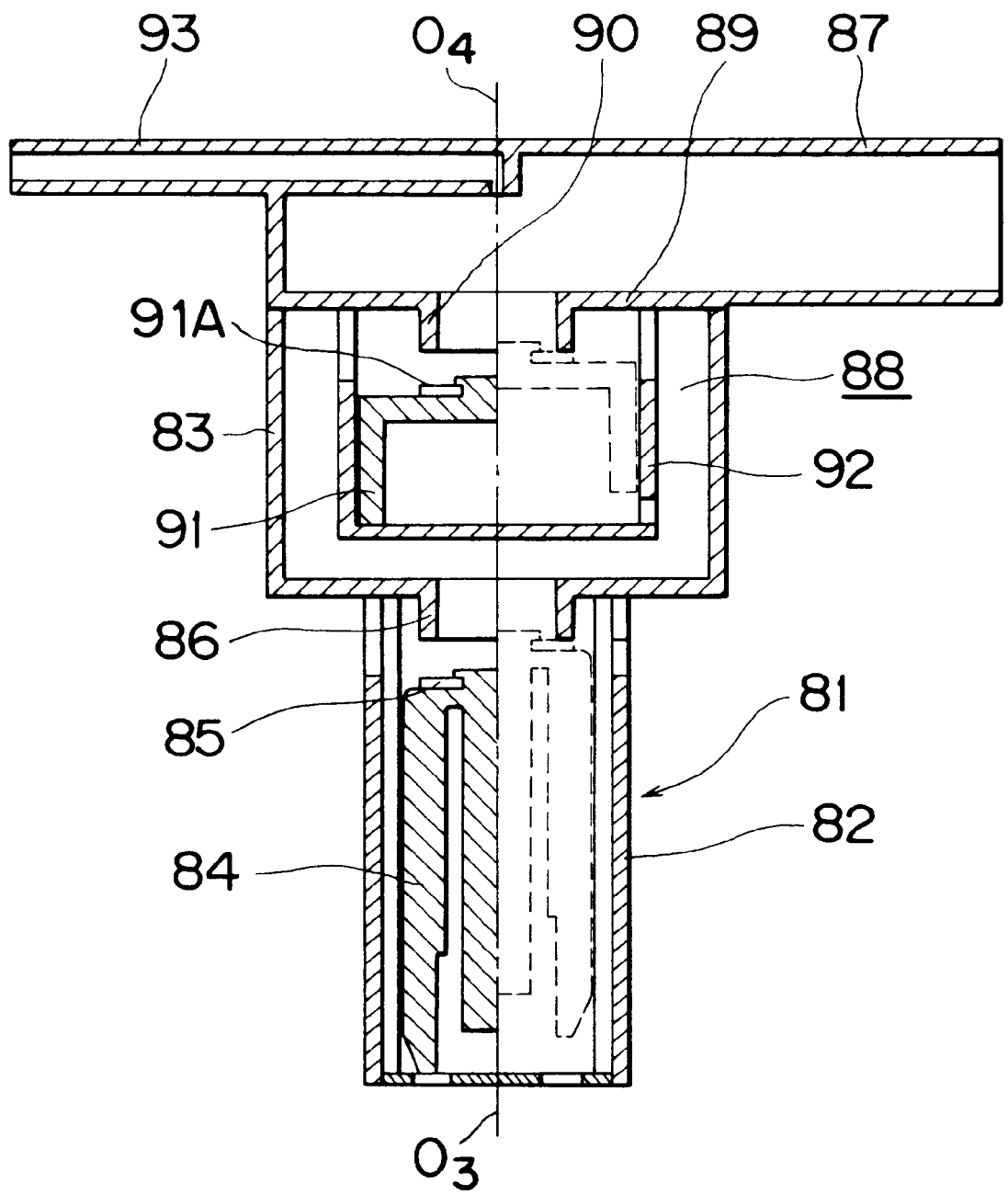
FIG. 2 is a cross-sectional view of a fuel vapor treating apparatus according to a second embodiment of the invention.
Figure 3:
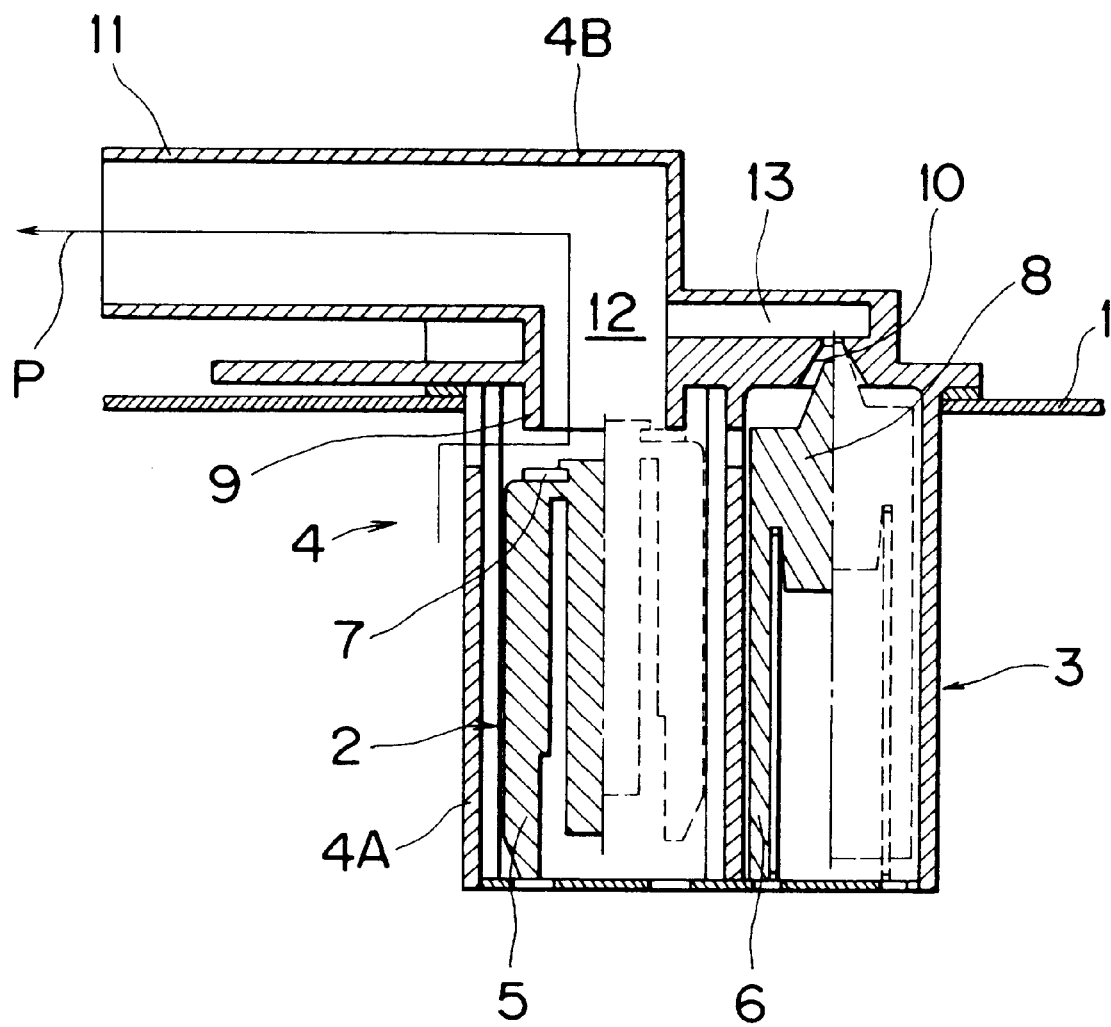
FIG. 3 is a cross-sectional view of a fuel vapor treating apparatus according to one example of the related art.
Figure 4:
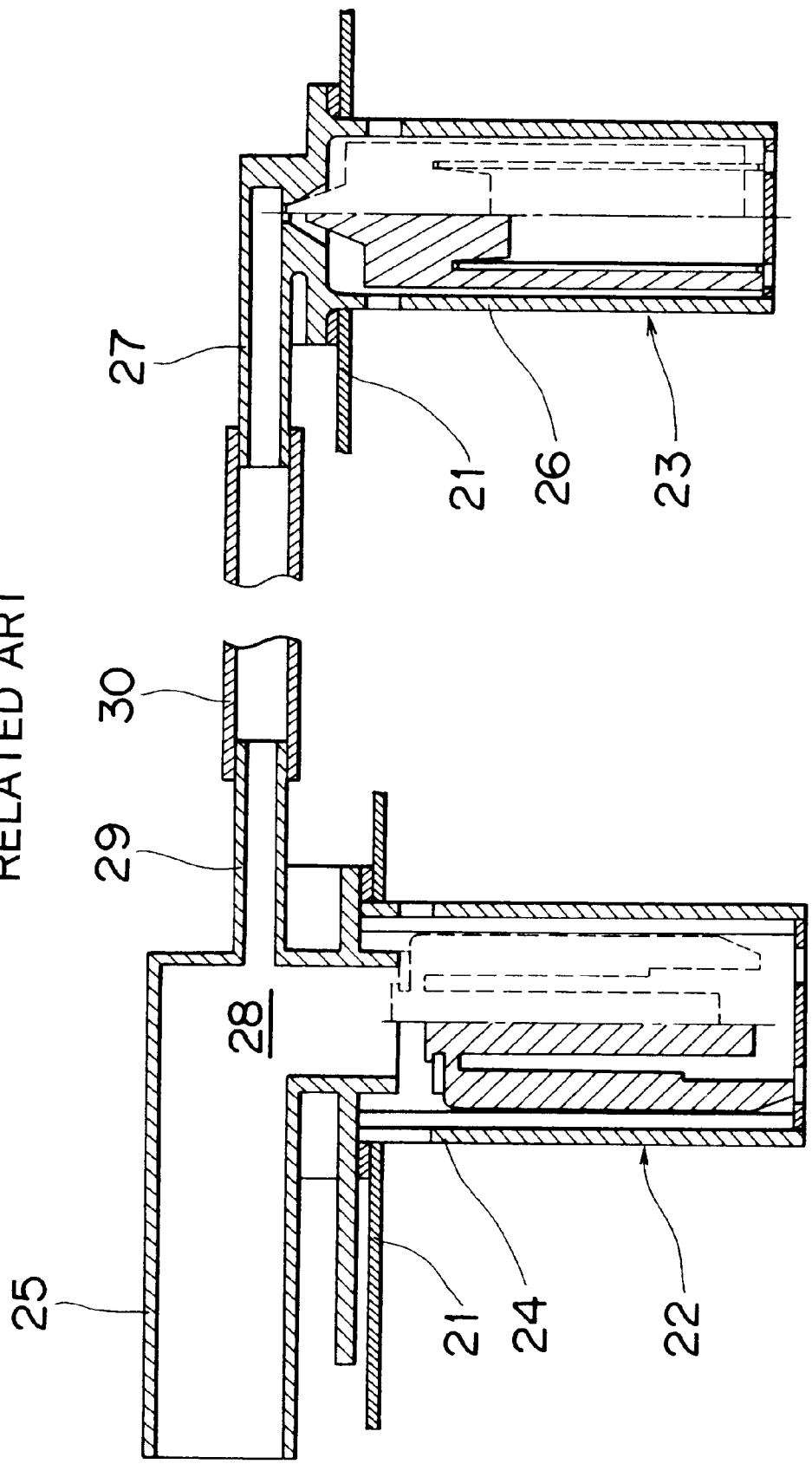
FIG. 4 is a cross-sectional view of a fuel vapor treating apparatus according to a second example of the related art.
Figure 5:
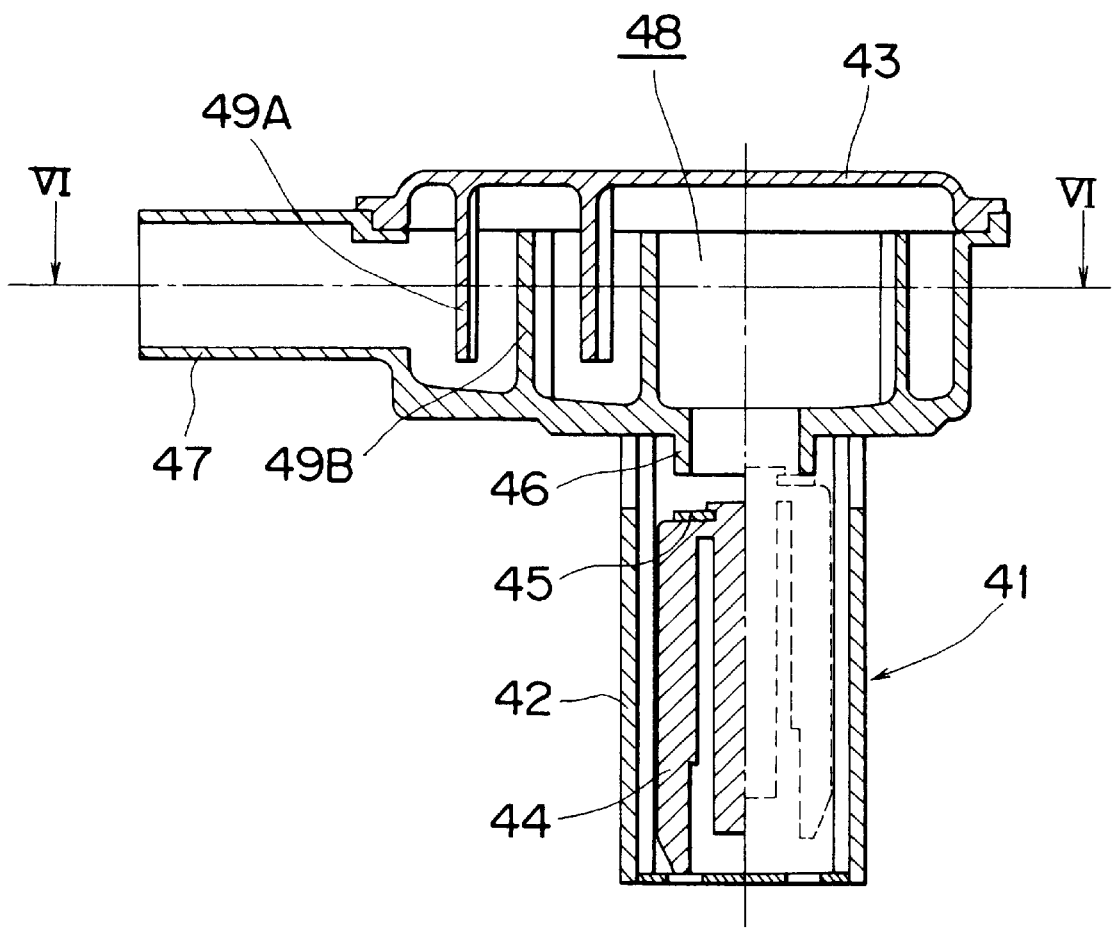
FIG. 5 is a cross-sectional view of a fuel vapor treating apparatus according to a third example of the related art.
Figure 6:
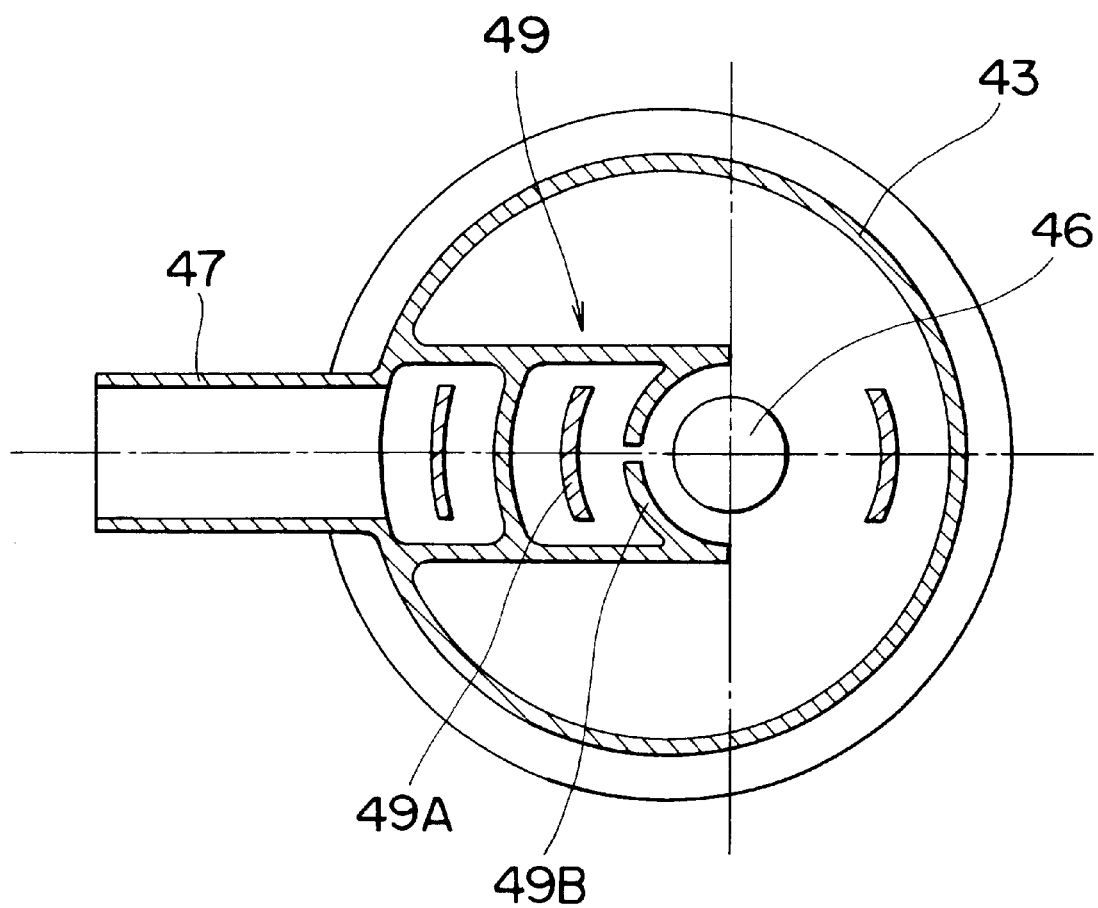
FIG. 6 is a cross-sectional top view taken along a line VI–VI shown in FIG. 5.
Figure 7:
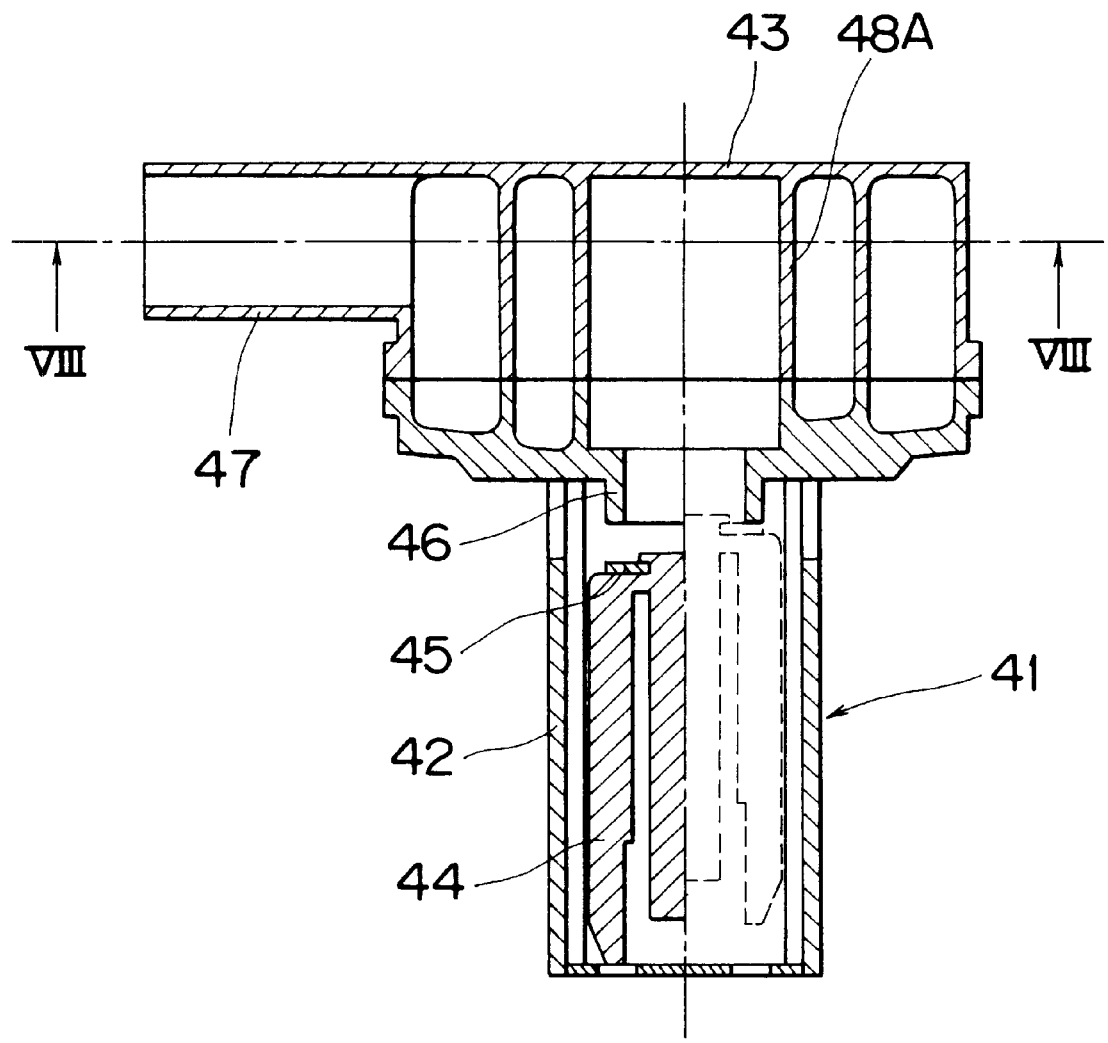
FIG. 7 is a cross-sectional view of a fourth example of a fuel vapor treating apparatus of the realted art.
Figure 8:
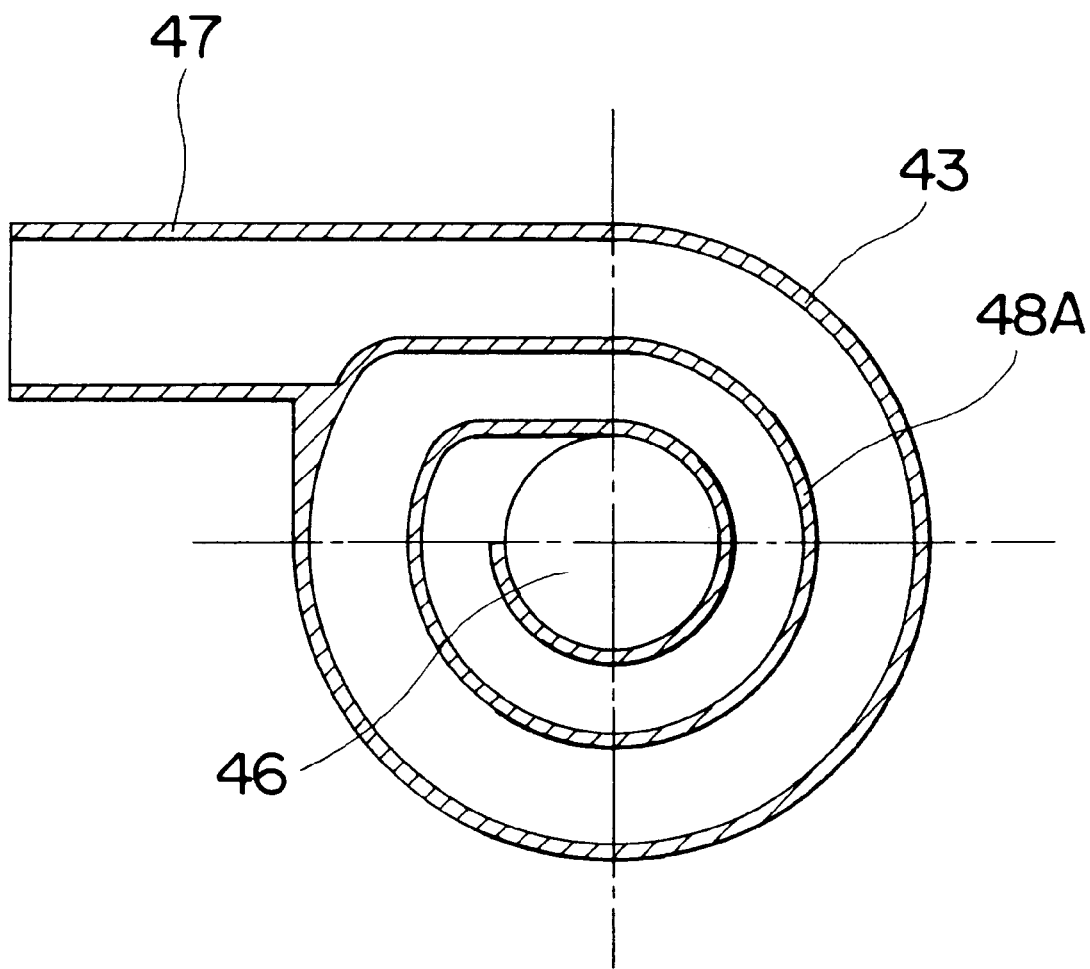
FIG. 8 is a cross-sectional top view taken along a line VIII—VIII shown in FIG. 7.
Figure 9:
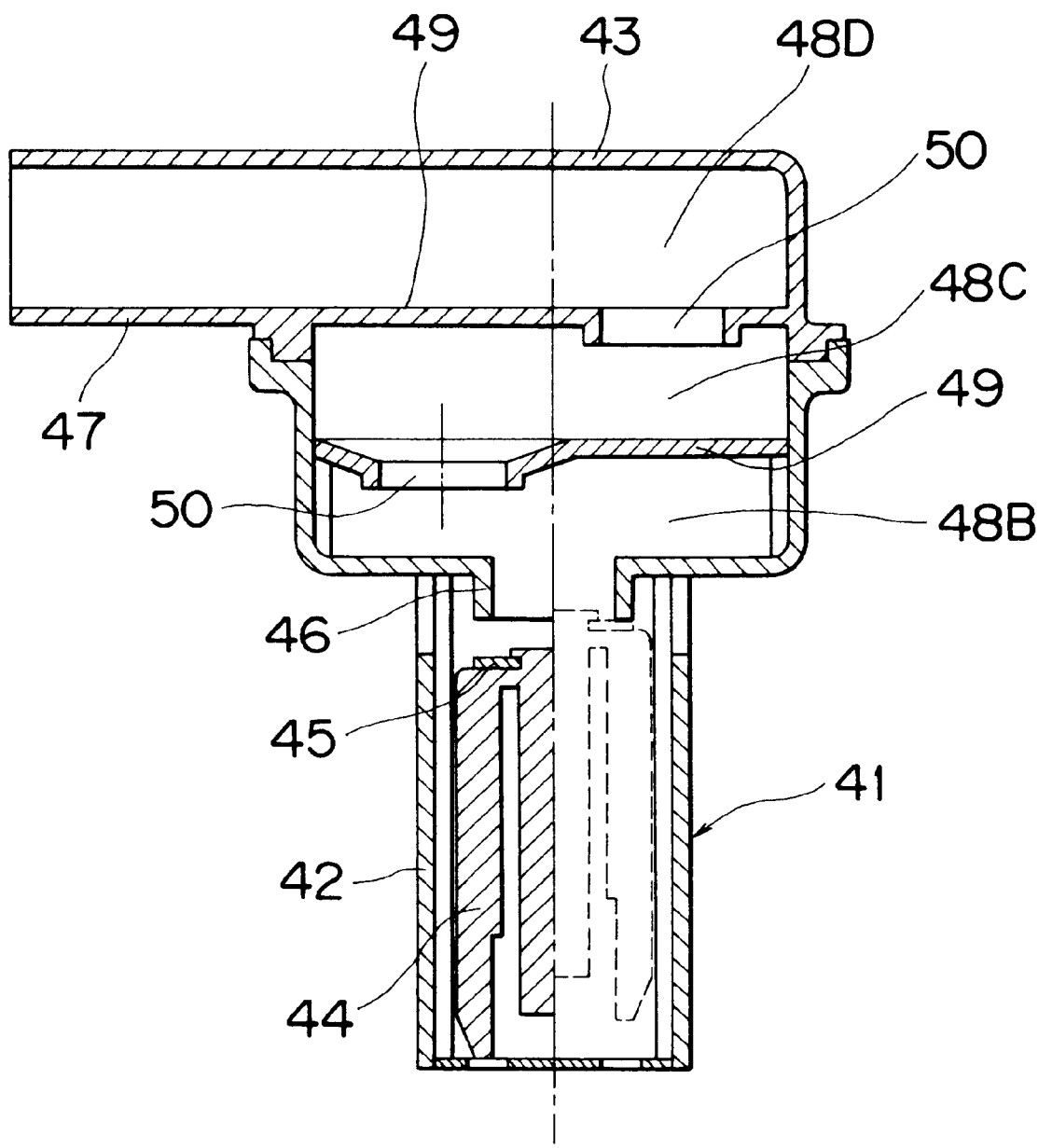
FIG. 9 is a cross-sectional view of a fifth example of a fuel vapor treating apparatus according to still another example of the related art.
Figure 10:
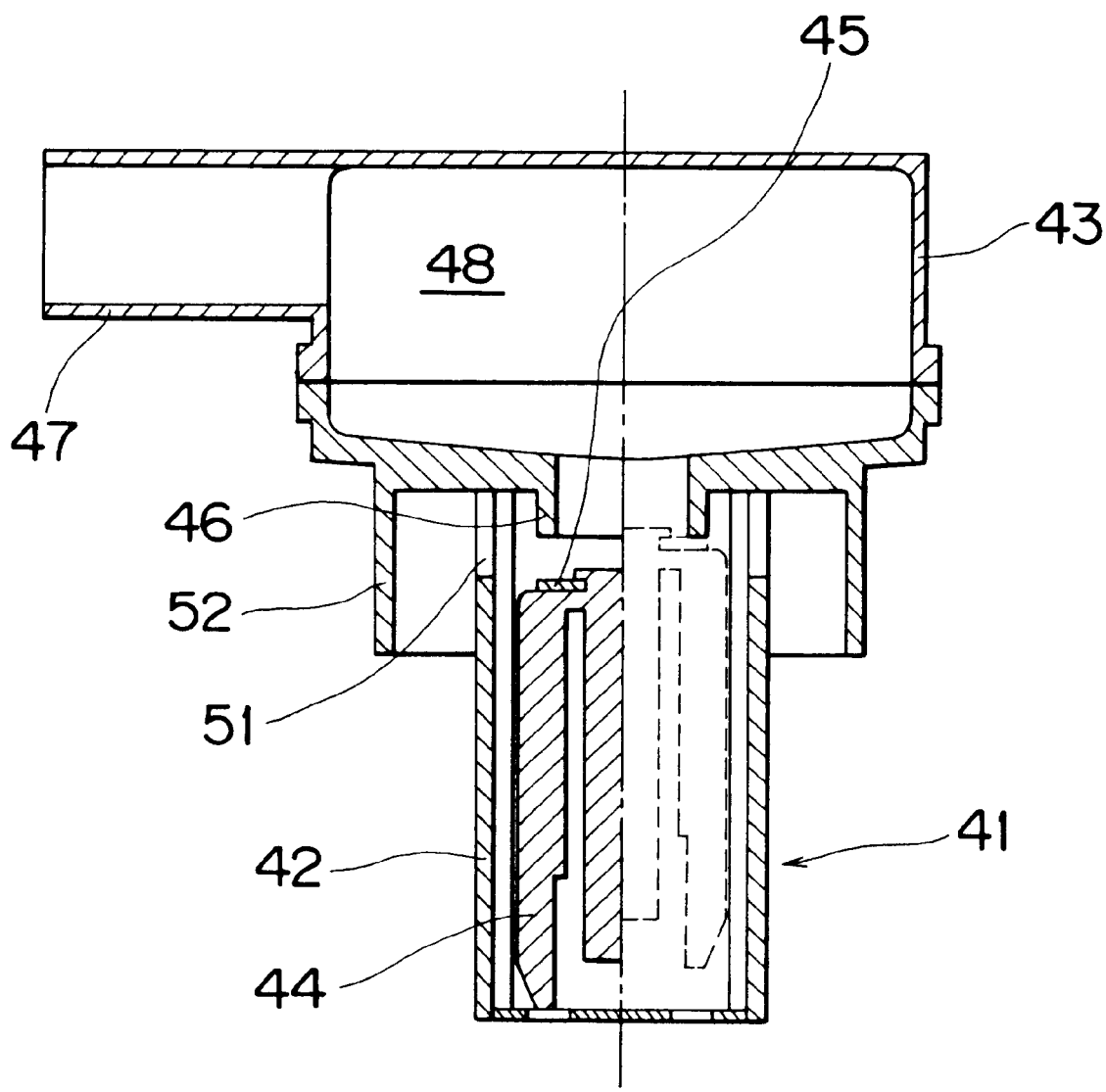
FIG. 10 is a cross-sectional view of a sixth example of a fuel vapor treating apparatus according to still another example of the related art.

Namely, referring to FIG. 2, a valve casing of a liquid level sensing valve 81 is composed of a lower valve casing 82 and an upper valve casing 83 that is disposed above the lower valve casing 83.

A float 84 is provided in the lower valve casing 82 and a valve portion 85 is provided on an upper face of the float 84. A valve port 86 is provided between the lower valve casing 82 and the upper valve casing 83 and is opened and closed by the valve portion 85. A vent passage portion 87 is provided in the upper valve casing 83, and a space portion 88 is provided between the vent passage portion 87 and the valve port 86.

In the second embodiment, the float 84 moves vertically in accordance with a liquid level of a fuel tank. The valve portion 85 of the float 84 opens the valve port 86, whereby the fuel tank is brought into communication with the vent passage portion 87.

In the above embodiment of the invention, a partition 89 for separating the space portion 88 from the vent passage portion 87 is provided in the space portion 88, and a vent port 90 is provided in the partition 89. A second float 91 for opening and closing the vent port 90 is provided.

A valve body 91A is provided in an upper portion of the second float 91. It is preferable that the valve body 91A be made from rubber or a soft plastic material such as fluororesin or the like to reliably close the vent port 90. Vertical movements of the second float 91 are guided by a guide tube 92 that extends from the partition 89.

In this embodiment, an axial center $O_3$ of the float 84 coincides with an axial center $O_4$ of the second float 91. Radial dimensions of the floats are reduced accordingly.

Although a fuel-cut valve is not shown in FIG. 2, a fuel-cut valve (not shown) is connected to a fuel-cut valve connecting port 93. The fuel-cut valve may either have a known structure or may be integrated with the liquid level sensing valve.

According to the invention that has been described hereinbefore, since the float for stopping flow of fuel is provided between the space portion and the vent passage portion, fuel leaking from the vent port due to vibration of a vehicle body or the like is reliably prevented and deterioration of a canister is restrained.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A valve apparatus comprising:
   a fuel tank that stores fuel;
   a valve comprising:
   a passage through which vapors of the fuel flow;
   a space portion that is interposed between the fuel tank and the passage;
   a first normally-open valve that closes a first communication passage extending between the fuel tank and the space portion in accordance with a liquid level of fuel in the fuel tank thereby interrupting fuel communication with the space portion, there being no other fuel communication in the valve casing between the fuel tank and the space portion; and
   a second normally-open valve that closes a second communication passage extending between the passage and the space portion in accordance with a liquid level of fuel flowing into the space portion.

2. The apparatus according to claim 1, wherein the valve casing further comprises:
   a lower valve casing that is disposed in the fuel tank; and
   an upper valve casing that is provided above the lower valve casing, wherein:
   the first normally-open valve is a first float that is provided in the lower valve casing and that moves vertically in accordance with a liquid level in the fuel tank, and
   the second normally-open valve is a second float that is provided in the upper valve casing and that moves vertically in accordance with the liquid level of fuel flowing into the space portion.

3. The apparatus according to claim 2, wherein:

a valve portion made from a plastic material or rubber is provided in an upper portion of the first float and closes the first communication passage, and a valve portion made from a plastic material is provided in an upper portion of the second float and closes the second communication passage.

4. The apparatus according to claim 2, wherein:

a valve port that opens to the space portion is provided in the upper valve casing, and a fuel-cut valve is connected to the valve port.

5. The apparatus according to claim 1, further comprising:

a partition that separates the space portion from the passage and that defines the second communication passage.

6. The apparatus according to claim 1, wherein:

the first normally-open valve and the second normally-open valve are disposed such that axial centers of the first normally-open valve and the second normally-open valve do not coincide with each other.

7. The apparatus according to claim 1, wherein:

the first normally-open valve and the second normally-open valve are disposed such that axial centers of the first normally-open valve and the second normally-open valve coincide with each other.

8. A fuel vapor treating apparatus comprising:

a fuel tank that stores fuel;

a lower valve casing;

an upper valve casing that is provided above the lower valve casing;

a first float that is provided in the lower valve casing;

a valve portion that is provided in the first float and that moves vertically in accordance with a liquid level in the fuel tank thereby interrupting fuel communication from the fuel tank;

a valve port that is provided between the lower valve casing and the upper valve casing and that is opened and closed by the valve portion;

a vent passage portion that is provided in the upper valve casing;

a space portion that is provided between the vent passage portion and the valve port and that communicates the fuel tank with the vent passage portion by opening the valve port;

a partition that separates the space portion from the vent passage portion and that is provided with a vent port for communication between the vent passage portion and the space portion; and a second float that opens and closes the vent port in response to the liquid level, wherein when the fuel is interrupted, there is no other fuel communication in the upper and lower valve casing between the fuel tank and the space portion.

9. The apparatus according to claim 8, wherein:

a valve port that opens to the space portion is provided in the upper valve casing, and a fuel-cut valve is connected to the valve port.

10. A fuel vapor treating apparatus in a fuel tank comprising:

a valve body;

a passage in the valve body through which vapors pass;

a space portion disposed intermediate to the passage;

a first valve that closes the passage between the fuel tank and the space portion in response to a liquid level of fuel in the fuel tank thereby interrupting fuel communication to the passage, there being no other fuel communication in the valve casing between the fuel tank and the space portion; and a second valve that closes the passage between the space portion and an upper region of the valve body in response to a liquid level of fuel flowing into the space portion.

11. The apparatus according to claim 10, wherein:

the first valve is a normally-open valve; and the second valve is a normally-open valve.

12. The apparatus according to claim 11, wherein the valve body comprises:

a lower valve casing that is disposed in the fuel tank; and an upper valve casing that is provided above the lower valve casing.

13. The apparatus according to claim 12, wherein:

the first normal-open valve is a first float that is provided in the lower valve casing and that moves vertically in accordance with a liquid level in the fuel tank, and the second normal-open valve is a second float that is provided in the upper valve casing and that moves vertically in accordance with a fuel pressure flowing into the space portion.

14. The apparatus according to claim 13, wherein:

a first seal made from a resilient material is provided on an upper portion of the first float and closes the passage, and a second seal made from a resilient material is provided on an upper portion of the second float and closes the passage.

15. The apparatus according to claim 12, wherein:

a valve port opens to the space portion and is provided in the upper valve casing, and a fuel-cut valve is connected to the valve port.

16. The apparatus according to claim 10, wherein:

a partition separates the space portion in the passage.

17. The apparatus according to claim 10, wherein:

axial centers of the first valve and the second valve do not coincide with each other.

18. The apparatus according to claim 10, wherein:

axial centers of the first valve and the second valve coincide with each other.

* * * * *